United States Patent [19]
Okada et al.

[11] Patent Number: 6,146,488
[45] Date of Patent: Nov. 14, 2000

[54] WELD BONDING METHOD

[75] Inventors: Toshiya Okada; Tomiharu Okita, both of Tokyo; Yasuhiro Okuri; Kiichi Yamashita, both of Osaka, all of Japan

[73] Assignees: Furukawa Electric Co., Ltd.; Sunstar Giken Kabushikikaisha, both of Japan

[21] Appl. No.: 08/954,966

[22] Filed: Oct. 21, 1997

Related U.S. Application Data

[63] Continuation of application No. 08/549,317, Oct. 27, 1995, abandoned.

[30] Foreign Application Priority Data

Oct. 28, 1994 [JP] Japan ......................................... 265379

[51] Int. Cl.⁷ ..................................................... B32B 31/00
[52] U.S. Cl. ....................... 156/273.9; 156/330; 228/175; 523/442; 523/459
[58] Field of Search ................................. 156/273.9, 330; 523/442, 459; 228/175

[56] References Cited

U.S. PATENT DOCUMENTS

| | | | |
|---|---|---|---|
| 2,510,727 | 6/1950 | Sussenbach | 156/273.9 |
| 3,972,111 | 8/1976 | Dash | 228/175 |
| 4,654,382 | 3/1987 | Hiza et al. | 523/442 |
| 5,240,645 | 8/1993 | Strecker | 523/459 |

*Primary Examiner*—John J. Gallagher
*Attorney, Agent, or Firm*—Lorusso & Loud

[57] ABSTRACT

The present invention is a weld bonding method providing adhesion by both an adhesive and resistance spot welding, and includes application of an adhesive including a thermosetting epoxy resin, a latent curing agent and 1 to 15 vol % of one or more additives selected from the group consisting of conductive metals, metal oxides, metal carbides, metal nitrides, metal borides, and metal silicides, which are in the from of powder having a particle size of 10 $\mu$m or less, or in the form of fragments or flakes having a thickness of 0.5 $\mu$m or more and a size of 30 $\mu$m or less.

8 Claims, No Drawings

WELD BONDING METHOD

This application is a continuation of application Ser. No. 08/549,317, filed Oct, 27, 1995, now abandoned.

BACKGROUND OF THE INVENTION

1. Field of the Invention

This invention relates to a weld bonding method which combines use of an adhesive with resistance spot welding and, more particularly, to a weld bonding method which permits substantial improvement of the overall bonding strength of weld bonded structures by the use of adhesives. The present invention finds application in the bonding of various structures such as auto body panels.

2. Description of the Prior Art

In general, a weld bonding method includes the steps of bonding a plurality of metal sheets together by means of resistance spot welding (hereinafter referred to simply as "spot welding") through an adhesive, and subsequently heat-treating the bonded metal sheets to cure the adhesive, whereby both the welding and the adhesive contribute to the overall bonding strength.

For instance, in case of applying the weld bonding method to the bonding of auto body panels, the panels go through several steps after spot welding, and are finally subjected to a baking finish. In this case, the adhesive is also cured simultaneously with heating in the baking finish, and therefore, the adhesive and the welding are combined to obtain the compounded bonding strength. Incidentally, even before heat curing of the adhesive, since the panels go through several processes as described above, substantial bonding strength of a certain value due to spot welding is required. Further, even after heat curing of the adhesive or when an adhered portion is released for some reason, it is necessary that substantial bonding strength of a certain value should be ensured for a spot weldment.

However, according to the conventional weld bonding method, since the adhesive is between the plurality of metal sheets as described above, the flow of welding current is degraded to prevent generation of heat in spot welding, or resistance heat is absorbed in the adhesive with the result that a calorific value sufficient to melt the material to be welded may not be obtainable. Thus, the conventional weld bonding method involves problems in that melting may be insufficient, while the weld nugget is inferior in internal quality as compared to that obtained in general spot welding using no adhesive, and sufficient welding strength before heat curing of the adhesive is hardly obtained.

On the other hand, when the current value is raised so as to sufficiently form a nugget, the conventional weld bonding method involves problems in that an electrode material is deposited on the material being welded or an explosion may occur to hardly obtain sufficient welding strength.

Bonding with the adhesive is adapted to obtain high strength by curing the adhesive through heat treatment, so that the bonding strength itself before heat curing of the adhesive is low as a matter of course.

Incidentally, the related art, e.g. Japanese Application Laid-open Nos. 60-173075, 61-4780, 62-68874, 64-53780, 2-150485 and 2-255883 disclose a proposal in which various kinds of metal fibers or the like are added to an adhesive so as to enhance weld bonding strength. However, even using this approach, it has been difficult to obtain sufficient welding strength before heat curing of the adhesive.

SUMMARY OF THE INVENTION

The present invention has been attained as the result of examination of the above problems, and has developed a weld bonding method which can obtain sufficient welding strength before heat curing of the adhesive by the improvement of the adhesive to be used in the weld bonding method.

According to the present invention, a weld bonding method uses adhesion by an adhesive and resistance spot welding together. The adhesive used includes a thermosetting epoxy resin, a latent curing agent and 1 to 15 vol % of one or more additives selected from the group consisting of conductive metals, metal oxides, metal carbides, metal nitrides, metal borides and metal silicides which are in the form of powder having a particle size of 10 $\mu$m or less, or in the form of fragments or flakes having a thickness of 0.5 $\mu$m or above and a size of 30 $\mu$m or less.

Examples of the conductive metal include Fe, Sn and Al and alloys thereof. Examples of the conductive metal oxide include oxides of Mn, Fe, Zr and Ti, and examples of the conductive metal carbide include carbides of Ti, Zr, V, Nb, Ta, Mo and W.

Examples of the conductive metal nitride include nitrides of Ti, Zr, V, Nb, Ta and Cr, and examples of the conductive metal boride include borides of Ti, Zr, Nb, Ta, Cr, Mo, W and La. Further, examples of the conductive metal silicide include silicides of Ti, Zr, Nb, Ta, Cr, Mo, W and Fe.

According to the present invention, as described above, the adhesive used includes the thermosetting epoxy resin, the latent curing agent and one or more additives selected from the group consisting of the conductive powdered, fragmented or flaked metal, metal oxide, metal carbide, metal nitride and metal silicide, whereby satisfactory conductivity in spot welding is attained to prevent defective melting, and a satisfactory nugget is formed to enhance the welding strength, while the adhesive and the additive are chemically stabilized to improve the weld bonding strength before heat curing of the adhesive.

A thermosetting epoxy resin is used as the adhesive in the present invention. The epoxy resin may include a commonly-used epoxy resin containing a glycidyl ether group, glycidyl ester group or the like, and the latent curing agent may include a commonly-used latent curing agent such as dicyandiamide, 4-4'-diaminodiphenyl sulfone, imidazole derivative, isophthalic dihydrazide or melamine derivative.

Further, an appropriate quantity of an ordinary filler (calcium carbonate, clay, talc, silica or the like), a plasticizer, a solvent and a pigment or the like may be added and mixed, as required.

Since conductivity is improved due to close adhesion due to pressure applied in spot welding, the particle size of the powdered additive is selected to be not more than 10 $\mu$m. When the particle size exceeds 10 $\mu$m, the additive not only deteriorates the conductivity, but also creates the danger of generating excessive heat in welding. Further, it is hard to mix the large particle size additive in manufacture of the adhesive.

Since it is necessary for the fragmented or flaked additive to have a thickness of 0.5 µm or more so as to obtain a predetermined shape, the fragmented or flaked additive is selected to have a thickness not less than 0.5 µm and a size not more than 30 µm. When the thickness is less than 0.5 µm, the additive produces no effect, and it is difficult to actually manufacture the adhesive. On the other hand, when the size exceeds 30 µm, the additive is non-uniformly distributed in the adhesive.

The quantity of additive to be added is set to be in the range of 1 to 15 vol % for the following reasons. When the quantity of additive is less than 1 vol %, the additive produces no effect. On the other hand, when the quantity of additive exceeds 15 vol %, the viscosity of the adhesive is increased, the weight of the adhesive is increased, and the additive is non- uniformly distributed in the adhesive, so that the additive creates the danger of generating excessive heat in spot welding to the point of causing an explosion or the like.

The additive preferably has conductivity and compatibility with the adhesive, and is chemically stabilized. A metal such as Fe, Sn and Al or an alloy thereof is suitable for use as the additive. Useful metal oxides include oxides of Mn, Fe, Zr and Ti such as $TiO_2$, ZrO, $MnO_2$ and $Fe_2O_3$, for example. Useful metal carbides include carbides of Ti, Zr, V, Nb, Ta, Mo and W such as TiC, ZrC, VC, NbC, TaC, $Mo_2C$ and WC, for example. Useful metal nitrides include nitrides of Ti, Zr, V, Nb, Ta and Cr such as TiN, ZrN, VN, NbN, TaN and $Cr_2N$, for example. Useful metal borides include borides of Ti, Zr, Nb, Ta, Cr, Mo, W and La such as CrB, $TiB_2$, $ZrB_2$, $NbB_2$, $TaB_2$, MoB, WB and LaB6, for example. The applicable metal silicides include silicides of Ti, Zr, Nb, Ta, Cr, MO, W and Fe such as $TiSi_2$, $ZrSi_2$, $NbSi_2$, $TaSi_2$, $CrSi_2$, $MoSi_2$, $WSi_2$ and ferrosilicon, for example. Use may be made of any one or a mixture of two or more of the additives mentioned above.

Any welding machine such as a single phase DC welding machine, a single phase AC welding machine, a condenser discharge welding machine and an inverted high frequency DC welding machine is effective in carrying out spot welding. An electrode made of chromium-copper, chromium-zirconium-copper or the like conventionally used materials can be used for the spot welding. An aluminum alloy sheet, a rolled steel sheet or a plated steel sheet, plated with zinc or the like, are effective as the materials to be welded, or a combination of different kinds of materials described above may be used as the materials to be welded.

DESCRIPTION OF THE PREFERRED EMBODIMENTS

Hereinafter will be described seven (7) preferred embodiments of the present invention, each contrasted with a comparative method and a conventional method. In the embodiments 1 to 7 described in the following, the bonding tests were each made with the same size welding material, but the kinds of additives, the quantity of additives added and the welding conditions were varied according to the method of the present invention, a comparative method without the scope of the present invention and a conventional method using the adhesive containing no additive.

Since different kinds of welding materials were used, the results of the bonding tests were judged according to standards prescribed by JIS (Japanese Industrial Standards) corresponding to each of the particular materials.

(Embodiment 1)

A5182P (Al—Mg—Mn alloy sheet)-O material having a size 1.0 mm in thickness×25 mm in width×100 mm in length was used as the material to be welded. The adhesive used was a thermosetting epoxy resin, and the additive used was $TiO_2$. The adhesive was applied and spread to a thickness of 0.1 mm over an area of 25 mm×25 mm. Two sheets of the material to be welded were placed together and one-spot welded in the center. The welding machine used was a single phase AC welding machine, and the electrode used was a constant radius electrode (R=80 mm) made of chromium-copper and having a diameter of 16 mm. Then, welding current was set to 26KA, electrode force was set to 2942N, and weld time was set to 5 cy for welding.

Five welds were prepared, and a mean value (2197N) of class "B" shear strength and a mean value (4.5 mm) of class "B" nugget diameter according to JIS Z3140 were used as the standards for evaluation. The tensile test was given to each test piece before heat curing of the adhesive, and the nugget diameter was measured with each test piece after the tensile test.

The evaluation was made as follows.

Evaluation

⊚: Both the shear strength and the nugget diameter satisfy the class "B" standard values (2197N and 4.5 mm) according to JIS.

Δ: Either the shear strength or the nugget diameter satisfies the class "B" standard value (2197N or 4.5 mm) according to JIS.

X: Neither the shear strength nor the nugget diameter satisfies the class "B" standard values (2197N and 4.5 mm) according to JIS.

Each of the shear strength and the nugget diameter was taken as a mean value of those for the five welds. The above test conditions and the results of the tests are shown in Table 1.

TABLE 1

| CLASSIFICATION | NO. | QUANTITY OF ADDITIVE (Vol %) | SIZE OF ADDITIVE (µm) | SHEAR STRENGTH (N) | NUGGET DIAMETER (mm) | EVALUATION |
|---|---|---|---|---|---|---|
| METHOD OF PRESENT INVENTION | 1 | 1 | PARTICLE SIZE: 8 | 2923 | 6.0 | ⊚ |
| | 2 | 5 | THICKNESS: 10, SIZE: 20 | 2724 | 5.7 | ⊚ |
| | 3 | 10 | PARTICLE SIZE: 10 | 2633 | 5.5 | ⊚ |
| | 4 | 15 | THICKNESS: 10, SIZE: 30 | 2356 | 4.9 | ⊚ |
| COMPARATIVE METHOD | 5 | 10 | PARTICLE SIZE: 30 | 2200 | 4.3 | Δ |
| | 6 | 30 | THICKNESS: 10, SIZE: 20 | 1845 | 3.9 | x |

TABLE 1-continued

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| | 7 | 0.5 | THICKNESS: 0.3, SIZE: 50 | 1528 | 3.5 | x |
| | 8 | 45 | PARTICLE SIZE: 50 | NOT WELDING DUE TO EXPLOSION | | x |
| CONVENTIONAL METHOD | 9 | NONE | — | 1438 | 3.0 | x |

As is apparent from Table 1, with respect to the test pieces Nos. 1 to 4 according to the method of the present invention, the shear strength in all cases substantially satisfied the 2197N standard value, and a high weld bond strength was obtained, while a nugget having a large diameter satisfactorily formed. On the other hand, with respect to the comparative test pieces Nos. 5 to 7, since the additive in the test piece No. 5 had a large particle size, the additive in the test piece No. 6 was excessive in quantity, and the additive in the test piece No. 7 was too small a quantity and had a small fragment thickness and a large fragment size, the shear strength in all cases was lower than the standard value, and a nugget having a small diameter was formed. Further, with respect to the test piece No. 8 according to the comparative method, because of the large quantity and particle size of the additive, the welding could not be carried out due to explosion. With respect to the test piece No. 9 according to the conventional method, using the adhesive containing no additive, the shear strength was lower than the standard value, and a nugget having a small diameter was formed.

(Embodiment 2)

A5182P (Al—Mg—Mn alloy sheet)-O material having a size 1.0 mm in thickness×25 mm in width×100 mm in length was used as a material which was welded together. The adhesive used was a thermosetting epoxy resin, and the additive used was ZrO. The adhesive was spread to a thickness of 0.2 mm over an area of 25 mm×25 mm. Then, two sheets of the material to be welded were placed together and one-spot welded in the center. The welding machine used was a single phase DC welding machine, and the electrode used was a dome-radiused cap tip electrode (6 mmø, 40 mmR) made of chromium-zirconium-copper and having a diameter of 16 mm. Further, welding current was set to 26KA, welding force was set to 3923N, and weld time was set to 5 cy for welding.

Five welds were made, and a mean value (1398N) of class "B" shear strength and a mean value (4.5 mm) of class "B" nugget diameter according to JIS Z3140 were used as the standards for evaluation. A tensile test was given to each test piece before heat curing of the adhesive, and the nugget diameter was measured for each test piece after the tensile test.

The evaluation was made as follows.

Evaluation

⊚: Both the shear strength and the nugget diameter satisfy the class "B" standard values (1398N and 4.5 mm) according to JIS.

Δ: Either the shear strength or the nugget diameter satisfies the class "B" standard value (1398N or 4.5 mm) according to JIS.

X: Neither the shear strength nor the nugget diameter satisfies the class "B" standard values (1398N and 4.5 mm) according to JIS.

Each of the shear strength and the nugget diameter were taken as a mean value for the five welds.

The above test conditions and the results of the tests are shown in Table 2.

TABLE 2

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| METHOD OF PRESENT INVENTION | 1 | 2 | THICKNESS: 0.5, SIZE: 30 | 2373 | 5.7 | ⊚ |
| | 2 | 5 | PARTICLE SIZE: 5 | 2242 | 5.5 | ⊚ |
| | 3 | 10 | PARTICLE SIZE: 10 | 2047 | 5.0 | ⊚ |
| | 4 | 13 | THICKNESS: 10, SIZE: 20 | 1803 | 4.6 | ⊚ |
| COMPARATIVE METHOD | 5 | 10 | PARTICLE SIZE: 50 | 1725 | 4.0 | Δ |
| | 6 | 30 | THICKNESS: 10, SIZE: 20 | 1332 | 3.7 | x |
| | 7 | 0.5 | THICKNESS: 0.3, SIZE: 50 | 1252 | 3.5 | x |
| | 8 | 50 | PARTICLE SIZE: 50 | NOT WELDING DUE TO EXPLOSION | | x |
| CONVENTIONAL METHOD | 9 | NONE | — | 875 | 2.7 | x |

As is apparent from Table 2, with respect to the test pieces Nos. 1 to 4 according to the method of the present invention, the shear strength in all cases substantially satisfied the 1398N standard value, and high weld bonding strength was obtained, while a nugget having a large diameter was satisfactorily formed. On the other hand, with respect to the test pieces Nos. 5 to 7, according to the comparative method, since the additive in the test piece No. 5 had an excessively large particle size, the additive in the test piece No. 6 was excessive in quantity, and the additive in the test piece No. 7 was too small in quantity and had a small fragment thickness and a large fragment size, the shear strength in all cases was lower than the standard value, and a nugget having a small diameter was formed. With respect to the test piece No. 8 according to the comparative method, since the additive was excessive in quantity and had too large a particle size, the welding could not be carried out due to explosion. Further, with respect to the test piece No. 9 according to the conventional method using the adhesive X: Neither the shear strength nor the nugget diameter satisfies the class "B" standard values (2173N and 4.5 mm) according to JIS.

Each of the shear strength and the nugget diameter was taken as the mean value of those for the five welds.

The above test conditions and the results of the tests are shown in Table 3.

TABLE 3

| CLASSIFICATION | NO. | QUANTITY OF ADDITIVE (Vol %) | SIZE OF ADDITIVE ($\mu$m) | SHEAR STRENGTH (N) | NUGGET DIAMETER (mm) | EVALUATION |
|---|---|---|---|---|---|---|
| METHOD OF PRESENT INVENTION | 1 | 1 | PARTICLE SIZE: 10 | 2568 | 6.0 | ◎ |
| | 2 | 5 | THICKNESS: 10, SIZE: 20 | 2432 | 5.5 | ◎ |
| | 3 | 10 | THICKNESS: 0.5, SIZE: 30 | 2454 | 5.3 | ◎ |
| | 4 | 15 | PARTICLE SIZE: 8 | 2365 | 5.2 | ◎ |
| COMPARATIVE METHOD | 5 | 10 | PARTICLE SIZE: 30 | 2008 | 4.0 | x |
| | 6 | 30 | THICKNESS: 10, SIZE: 20 | NOT WELDING DUE TO EXPLOSION | | x |
| | 7 | 0.5 | THICKNESS: 0.3, SIZE: 50 | NOT WELDING DUE TO EXPLOSION | | x |
| | 8 | 45 | PARTICLE SIZE: 50 | NOT WELDING DUE TO EXPLOSION | | x |
| CONVENTIONAL METHOD | 9 | NONE | — | 1353 | 3.7 | x | containing no additive, the shear strength was lower than the standard value, and a nugget having a small diameter was formed.

(Embodiment 3)

A5182P (Al—Mg—Mn alloy sheet)-O material having a size of 1.0 mm in thickness×25 mm in width×100 mm in length was used as the material welded. The adhesive used was a thermosetting epoxy resin, and the additive used was TiN. The adhesive was coated to a thickness of 0.1 mm and spread to cover an area of 25 mm×25 mm. Then, two sheets of material to be welded were placed together to carry out one-spot welding in the center. The welding machine used was an inverted high frequency DC welding machine, and the electrode used was a rounded cap tip electrode (R=40 mm) made of chromium-copper and having a diameter of 16 mm. Further, welding current was set to 28KA, welding force was set to 3923N, and weld time was set to 5 cy for welding.

Five welds were prepared, and a mean value for class "B" shear strength (2173N) and a mean value (4.5 mm) for class "B" nugget diameter according to JIS Z3140 were used as the standards for evaluation. A tensile test was given to each test piece before heat curing of the adhesive, and the nugget diameter was measured for each test piece after the tensile test.

The evaluation was made as follows.

Evaluation

◎: Both the shear strength and the nugget diameter satisfy the class "B" standard values (2173N and 4.5 mm) according to JIS.

Δ: Either the shear strength or the nugget diameter satisfies the class "B" standard value (2173N or 4.5 mm) according to JIS.

As is apparent from Table 3, with respect to the test pieces Nos. 1 to 4 according to the method of the present invention, the shear strength in all cases substantially satisfied the standard value of 2173N, high weld bonding strength was obtained, and a nugget having a large diameter satisfactorily formed. On the other hand, with respect to the test piece No. 5 according to the comparative method, since the additive had too large a particle size, the shear strength was lower than the standard value, and a nugget having a small diameter was formed. With respect to the test pieces Nos. 6 to 8 according to the comparative method, the additive in the test piece No. 6 was too large in quantity, the additive in the test piece No. 7 was too large in quantity and had too small a fragment thickness and too large a fragment size, and the additive in the test piece No. 8 was too large in quantity and had too large a particle size, and welding could not be carried out due to explosion in all cases. Further, with respect to the test piece No. 9 according to the conventional method using the adhesive containing no additive, the shear strength was lower than the standard value, and a nugget having a small diameter was formed.

(Embodiment 4)

SPC (a cold-rolled steel sheet) having a size 0.8 mm in thickness×25 mm in width×100 mm in length was used as the material to be welded. The adhesive used was a thermosetting epoxy resin, and the additive used was CrB. The adhesive was coated to 0.1 mm in thickness and spread to cover an area of 25 mm×25 mm. Then, two sheets of the material to be welded were placed together to carry out one-spot welding in the center. The welding machine used was a single phase AC welding machine, and the electrode used was a dome-shaped cap tip electrode (6 mmø, 40 mmR) made of chromium-copper and having a diameter of 16 mm. Further, welding current was set to 9KA, welding force was set to 2942N, and weld time was set to 5 cy for welding.

Five welds were prepared, and a mean value (2956N) of class "B" shear strength and a mean value (4.0 mm) of class "B" nugget diameter according to JIS Z3140 were applied as the standards for evaluation. A tensile test was given to each test piece before heat curing of the adhesive, and the nugget diameter was measured for each test piece after the tensile test.

The evaluation was made as follows.

Evaluation

⊚: Both the shear strength and the nugget diameter satisfy the class "B" standard values (2956N and 4.0 mm) according to JIS.

Δ: Either the shear strength or the nugget diameter satisfies the class "B" standard value (2956N or 4.0 mm) according to JIS.

X: Neither the shear strength nor the nugget diameter satisfies the class "B" standard values (2956N and 4.0 mm) according to JIS.

Each of the shear strength and the nugget diameter was taken as a mean value for the five welds.

The above test conditions and the results of the tests are shown in Table 4.

contained in the adhesive in the test piece No. 9, the shear strength in all cases was lower than the standard value, and a nugget having a small diameter was formed.

(Embodiment 5)

A5182P (Al—Mg—Mn alloy sheet)-O material having the size of 1.0 mm in thickness×25 mm in width×100 mm in length was used as the material to be welded. The adhesive used was a thermosetting epoxy resin, and the additive used was $ZrSi_2$. The adhesive was coated to a thickness of 0.2 mm in thickness to cover an area of 25 mm×25 mm. Then, two sheets of the material to be welded were placed to carry out one-spot welding in the center. The welding machine used was a single phase DC welding machine, and the electrode used was an integral radiused electrode (R=80 mm) made of chromium-copper and having a diameter of 16 mm. Further, welding current was set to 28KA, welding force was set to 2942N, and weld time was set to 5 cy for welding.

Five welds were prepared, and a mean value (1161N) of class "B" shear strength and a mean value (4.5 mm) of class "B" nugget diameter according to JIS Z3140 were used as the standards for evaluation. A tensile test was given to each test piece before heat curing of the adhesive, and the nugget diameter was measured with each test piece after the tensile test.

TABLE 4

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| METHOD OF PRESENT INVENTION | 1 | 3 | PARTICLE SIZE: 5 | 3584 | 6.3 | ⊚ |
| | 2 | 5 | PARTICLE SIZE: 10 | 3346 | 6.0 | ⊚ |
| | 3 | 9 | THICKNESS: 10, SIZE: 30 | 3085 | 5.7 | ⊚ |
| | 4 | 15 | THICKNESS: 10, SIZE: 30 | 3074 | 5.5 | ⊚ |
| COMPARATIVE METHOD | 5 | 10 | PARTICLE SIZE: 50 | NOT WELDING DUE TO EXPLOSION | | x |
| | 6 | 30 | THICKNESS: 10, SIZE: 20 | NOT WELDING DUE TO EXPLOSION | | x |
| | 7 | 0.5 | THICKNESS: 0.3, SIZE: 50 | 1514 | 3.5 | x |
| | 8 | 45 | PARTICLE SIZE: 50 | NOT WELDING DUE TO EXPLOSION | | x |
| CONVENTIONAL METHOD | 9 | NONE | — | 2122 | 3.8 | x |

As is apparent from Table 4, with respect to the test pieces Nos. 1 to 4, according to the method of the present invention, the shear strength in all cases substantially satisfied the standard value of 2956N, and high weld bonding strength was obtained, while a nugget having a large diameter was satisfactorily formed. On the other hand, with respect to the test pieces Nos. 5, 6 and 8 according to the comparative method, since the additive in the test piece No. 5 had too large a particle size, the additive in the test piece No. 6 was excessive in quantity, and the additive in the test piece No. 8 was both excessive in quantity and in particle size, the welding could not be carried out due to explosion in all cases. Further, with respect to the test pieces Nos. 7 and 9 according to the comparative method and the conventional method, since the additive in the test piece No. 7 was too small in quantity and had too small a fragment thickness and too large a fragment size, and because no additive was The evaluation was made as follows.

Evaluation

⊚: Both the shear strength and the nugget diameter satisfy the class "B" standard values (1161N and 4.5 mm) according to JIS.

Δ: Either the shear strength or the nugget diameter satisfies the class "B" standard value (1161N or 4.5 mm) according to JIS.

X: Neither the shear strength nor the nugget diameter satisfies the class "B" standard values (1161N and 4.5 mm) according to JIS.

Each of the shear strength and the nugget diameter was taken as a mean value for the five welds.

The above test conditions and the results of the tests are shown in Table 5.

TABLE 5

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| METHOD OF | 1 | 1 | THICKNESS: 10, SIZE: 20 | 1909 | 5.7 | ⊚ |
| PRESENT | 2 | 5 | PARTICLE SIZE: 10 | 2032 | 5.7 | ⊚ |
| INVENTION | 3 | 10 | PARTICLE SIZE: 10 | 1758 | 5.0 | ⊚ |
|  | 4 | 14 | THICKNESS: 10, SIZE: 30 | 1363 | 4.6 | ⊚ |
| COMPARATIVE | 5 | 10 | PARTICLE SIZE: 30 | 1035 | 3.0 | x |
| METHOD | 6 | 30 | THICKNESS: 10, SIZE: 20 | NOT WELDING DUE TO EXPLOSION |  | x |
|  | 7 | 0.5 | THICKNESS: 0.3, SIZE: 50 | 1274 | 3.8 | Δ |
|  | 8 | 45 | PARTICLE SIZE: 50 | NOT WELDING DUE TO EXPLOSION |  | x |
| CONVENTIONAL METHOD | 9 | NONE | — | 806 | 2.7 | x |

As is apparent from Table 5, with respect to the test pieces Nos. 1 to 4 according to the method of the present invention, the shear strength in all cases substantially satisfied the standard value of 1161N, and high weld bonding strength was obtained, while a nugget having a large diameter was satisfactorily obtained. On the other hand, with respect to the test pieces Nos. 5 and 7 according to the comparative method, since the additive in the test piece No. 5 had an excessively large particle size, and the additive in the test piece No. 7 was too small in quantity and had too small a fragment thickness and too large a fragment size, the shear strength in all cases was lower than the standard value, and a nugget having a small diameter was formed. With respect to the test pieces Nos. 6 and 8 according to the comparative method, since the additive in the test piece No. 6 was too large in quantity, and the additive in the test piece No. 8 was too large in quantity and had too large a particle size, the welding could not be carried out due to explosion in all cases. Further, with respect to the test piece No. 9 according to the conventional method using the adhesive containing no additive, the shear strength was lower than the standard value, and a nugget having a small diameter was formed.

(Embodiment 6)

A5182P (Al—Mg—Mn alloy sheet)-O material having the size of 1.0 mm in thickness×25 mm in width×100 mm in length was used as the material to be welded. The adhesive used was a thermosetting epoxy resin, and the additive used was Al. The adhesive was coated to a thickness of 0.2 mm and spread to cover an area of 25 mm×25 mm. Then, two sheets of the materials to be welded were placed together to carry out one-spot welding in the center. The welding machine used was an inverted high frequency DC welding machine, and the electrode used was a CF-shaped cap tip electrode made of chromium-copper and having a diameter of 16 mm. Further, welding current was set to 28KA, welding force was set to 3923N, and weld time was set to 5 cy for welding.

Five welds were prepared, and a mean value (2197N) of class "B" shear strength and a mean value (4.5 mm) of class "B" nugget diameter according to JIS Z3140 were used as the standards for evaluation. A tensile test was given to each test piece before heat curing of the adhesive, and the nugget diameter was measured for each test piece after the tensile test.

The evaluation was made as follows.

Evaluation

⊚: Both the shear strength and the nugget diameter satisfy the class "B" standard values (2197N and 4.5 mm) according to JIS.

Δ: Either the shear strength or the nugget diameter satisfies the class "B" standard value (2197N or 4.5 mm) according to JIS.

X: Neither the shear strength nor the nugget diameter satisfies the class "B" standard values (2197N and 4.5 mm) according to JIS.

Each of the shear strength and the nugget diameter was taken as a mean value for those of the five welds.

The above test conditions and the results of the tests are shown in Table 6.

TABLE 6

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| METHOD OF | 1 | 1 | PARTICLE SIZE: 8 | 2572 | 5.2 | ⊚ |
| PRESENT | 2 | 5 | THICKNESS: 10, SIZE: 20 | 2548 | 5.2 | ⊚ |
| INVENTION | 3 | 12 | THICKNESS: 10, SIZE: 30 | 2467 | 4.9 | ⊚ |
|  | 4 | 15 | PARTICLE SIZE: 10 | 2259 | 4.7 | ⊚ |
| COMPARATIVE | 5 | 10 | PARTICLE SIZE: 30 | 2035 | 4.3 | x |
| METHOD | 6 | 30 | THICKNESS: 10, SIZE: 20 | NOT WELDING DUE TO EXPLOSION |  | x |
|  | 7 | 0.5 | THICKNESS: 0.3, SIZE: 50 | 1543 | 3.6 | x |
|  | 8 | 50 | PARTICLE SIZE: 50 | NOT WELDING |  | x |

TABLE 6-continued

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| CONVENTIONAL METHOD | 9 | NONE | — | DUE TO EXPLOSION 734 | 2.5 | x |

As is apparent from Table 6, with respect to the test pieces Nos. 1 to 4 according to the method of the present invention, the shear strength in all cases substantially satisfied the standard value of 2197N, and high weld bonding strength was obtained, while a nugget having a large diameter satisfactorily formed. On the other hand, with respect to the test pieces Nos. 5 and 7 according to the comparative method, since the additive in the test piece No. 5 had too large a particle size, and the additive in the test piece No. 7 was too small in quantity and had too small a fragment thickness and too large a fragment size, the shear strength in all cases was lower than the standard value, and a nugget having a small diameter formed. With respect to the test pieces Nos. 6 and 8 according to the comparative method, since the additive in the test piece No. 6 was too large in quantity, and the additive in the test piece No. 8 was both too large in quantity and had too large a particle size, the welding could not be carried out due to explosion in all cases. Further, with respect to the test piece No. 9 according to the conventional method using the adhesive containing no additive, the shear strength was lower than the standard value, and a nugget having a small diameter formed.

Further, welding current was set to 24KA, welding force was set to 2942N, and weld time was set to 5 cy for welding.

Five welds were prepared, and a mean value (2173N) of class "B" shear strength and a mean value (4.5 mm) of class "B" nugget diameter according to JIS Z3140 were applied as the standards for evaluation. A tensile test was given to each test piece before heat curing of the adhesive, and the nugget diameter was measured for each test piece after the tensile test.

The evaluation was made as follows.

Evaluation

⊚: Both the shear strength and the nugget diameter satisfy the class "B" standard values (2173N and 4.5 mm) according to JIS.

Δ: Either the shear strength or the nugget diameter satisfies the class "B" standard value (2173N or 4.5 mm) according to JIS.

X: Neither the shear strength nor the nugget diameter satisfies the class "B" standard values (2173N and 4.5 mm) according to JIS.

Each of the shear strength and the nugget diameter was taken as a mean value for the five welds.

The above test conditions and the results of the tests are shown in Table 7.

TABLE 7

| CLASSIFICATION | NO. | QUANTITY OF ADDITIVE (Vol %) | SIZE OF ADDITIVE (μm) | SHEAR STRENGTH (N) | NUGGET DIAMETER (mm) | EVALUATION |
|---|---|---|---|---|---|---|
| METHOD OF PRESENT INVENTION | 1 | ①: 1 + ②: 3 | PARTICLE SIZE: 8 | 2668 | 5.3 | ⊚ |
| | 2 | ①: 3 + ②: 5 | THICKNESS: 0.5, SIZE: 20 | 2453 | 5.0 | ⊚ |
| | 3 | ①: 7 + ②: 5 | THICKNESS: 0.5, SIZE: 20 | 2336 | 4.8 | ⊚ |
| | 4 | ①: 8 + ②: 7 | PARTICLE SIZE: 10 | 2256 | 4.7 | ⊚ |
| COMPARATIVE METHOD | 5 | ①: 3 + ②: 5 | PARTICLE SIZE: 30 | 1917 | 4.2 | x |
| | 6 | ①: 20 + ②: 10 | THICKNESS: 0.5, SIZE: 20 | NOT WELDING DUE TO EXPLOSION | | x |
| | 7 | ①: 0.2 + ②: 0.2 | THICKNESS: 0.3, SIZE: 50 | 1334 | 3.2 | x |
| | 8 | ①: 20 + ②: 30 | PARTICLE SIZE: 50 | NOT WELDING DUE TO EXPLOSION | | x |
| CONVENTIONAL METHOD | 9 | NONE | — | 1173 | 3.0 | x |

NOTE) QUANTITY OF ADDITIVE: ①TiC + ②Al (Embodiment 7)

A5182P (Al—Mg—Mn alloy sheet)-O material having a size of 1.0 mm in thickness×25 mm in width×100 mm in length was used as the material to be welded. The adhesive used was a thermosetting epoxy resin, and the additive used was TiC and Al. The adhesive was coated to a thickness of 0.1 mm and spread to cover an area of 25 mm×25 mm. Then, two sheets of the material to be welded were placed together to carry out one-spot welding in the center. The welding machine used was a single phase DC welding machine, and the electrode used was a radiused cap electrode (R=80 mm) made of chromium-copper and having a diameter of 16 mm.

As is apparent from Table 7, with respect to the test pieces Nos. 1 to 4 according to the method of the present invention, the shear strength in all cases substantially satisfied the standard value of 2173N, and high weld bonding strength was obtained, while a nugget having a large diameter satisfactorily formed. On the other hand, with respect to the test pieces Nos. 5 and 7 according to the comparative method, since the additive in the test piece No. 5 had a large particle size, and the additive in the test piece No. 7 was too small in quantity and had too small a fragment thickness and too large a fragment size, the shear strength in all cases was lower than the standard value, and a nugget having a small diameter formed. With respect to the test pieces 6 and 8 according to the comparative method, since the additive in the test piece No. 6 was too large in quantity, and the additive in the test piece No. 8 was both too large in quantity and too large in particle size, the welding could not be carried out due to explosion in all cases. Further, with respect to the test piece No. 9 according to the conventional method using the adhesive containing no additive, the shear strength was lower than the standard value, and a nugget having a small diameter is formed.

As described above, according to the present invention, it is possible to perform high-strength resistance spot welding, which provides high weld bonding strength before heat curing the adhesive, causes the formation of a satisfactory nugget, and is highly reliable. Accordingly, it is possible to substantially improve the overall bonding strength of structures resulting from compounding the welding strength and the bonding strength after heat curing of the adhesive.

What is claimed is:

1. A weld bonding method for bonding metal surfaces together with adhesion both by an adhesive and by resistance spot welding through the adhesive, comprising the steps of:

preparing the adhesive by admixing a thermosetting epoxy resin, a latent curing agent and 1 to 15 vol % of one or more conductive additives selected from the group consisting of metal, metal oxide, metal carbide, metal nitride, metal boride and metal silicide, said additive being in the form of a powder having a particle size of 10 μm or less, or in the form of fragments or flakes having a thickness of at least 0.5 μm and a particle size of 30 μm or less;

applying the adhesive to at least one of the metal surfaces to be bonded;

then spreading the applied adhesive;

then placing the metal surfaces together with the spread adhesive therebetween;

then spot welding the metal surfaces together; and then heating the metal surfaces to cure the adhesive whereby the additive improves conductivity to enhance the strength of the spot welds.

2. A weld bonding method according to claim 1, wherein said conductive metal includes Fe, Sn and Al or an alloy thereof.

3. A weld bonding method according to claim 1, wherein said conductive metal oxide includes oxides of Mn, Fe, Zr and Ti.

4. A weld bonding method according to claim 1, wherein said conductive metal carbide includes carbides of Ti, Zr, V, Nb, Ta, Mo and W.

5. A weld bonding method according to claim 1, wherein said conductive metal nitride includes nitrides of Ti, Zr, V, Nb, Ta and Cr.

6. A weld bonding method according to claim 1, wherein said conductive metal boride includes borides of Ti, Zr, Nb, Ta, Cr, Mo, W and La.

7. A weld bonding method according to claim 1, wherein said conductive metal silicide includes silicides of Ti, Zr, Nb, Ta, Cr, Mo, W and Fe.

8. A weld bonding method according to claim 1 wherein the applied adhesive is spread to a thickness of 0.2 mm or less prior to placing the metal surfaces together.

* * * * *

UNITED STATES PATENT AND TRADEMARK OFFICE
CERTIFICATE OF CORRECTION

PATENT NO.   : 6,146,488
DATED        : November 14, 2000
INVENTOR(S)  : Okada et al.

Page 1 of 1

It is certified that error appears in the above-identified patent and that said Letters Patent is hereby corrected as shown below:

Column 3,
Line 33, "LaB6" should be -- $LaB_6$ --.

Column 3 &4,
Table 1, under the heading "Evaluation", line 5, "Λ" should read -- $\Delta$ --.

Column 16,
Delete lines 10-29 (claims 2-7) and substitute therefor:
-- 2.   A weld bonding method according to claim 1, wherein said additive is a conductive metal selected from the group consisting of Fe, Sn, Al and alloys thereof.
3. A weld bonding method according to claim 1, wherein said additive is a conductive metal oxide selected from the group consisting of oxides of Mn, Fe, Zr and Ti.

4. A weld bonding method according to claim 1, wherein said additive is a conductive metal carbide selected from the group consisting of carbides of Ti, Zr, V, Nb, Ta, Mo and W.

5. A weld bonding method according to claim 1, wherein said additive is conductive metal nitride selected from the group consisting of nitrides of Ti, Zr, V, Nb, Ta and Cr.

6. A weld bonding method according to claim 1, wherein said additive is conductive metal boride selected from the group consisting of borides of Ti, Zr, Nb, Ta, Cr, Mo, W and La.

7. A weld bonding method according to claim 1, wherein said additive is conductive metal silicide selected from the group consisting of silicides of Ti, Zr, Nb, Ta, Cr, Mo, W and Fe. --

Signed and Sealed this

Fourth Day of December, 2001

*Attest:*

*Attesting Officer*

NICHOLAS P. GODICI
*Acting Director of the United States Patent and Trademark Office*